United States Patent [19]

Haag et al.

[11] 4,048,262

[45] Sept. 13, 1977

[54] POLYDODECENAMERS AS REINFORCING RESINS FOR ELASTOMERS

[75] Inventors: Horst Haag; Karl-Heinz Nordsiek; Roland Streck, all of Marl; Dieter Zerpner, Oer-Erkenschwick, all of Germany

[73] Assignee: Chemische Werke Huls Aktiengesellschaft, Marl, Germany

[21] Appl. No.: 639,364

[22] Filed: Dec. 10, 1975

[30] Foreign Application Priority Data

Jan. 2, 1975 Germany .............................. 2500025

[51] Int. Cl.[2] .......................... C08L 9/00; C08L 23/00
[52] U.S. Cl. ................................ 260/889; 260/897 A; 526/104; 526/308
[58] Field of Search ........................... 260/889, 897 A; 526/308, 104, 888

[56] References Cited

U.S. PATENT DOCUMENTS 3,931,357   1/1976   Meyer et al. .................... 260/897 A

FOREIGN PATENT DOCUMENTS 2,131,354   1/1973   Germany

Primary Examiner—J. Ziegler
Attorney, Agent, or Firm—Millen & White

[57] ABSTRACT

The properties of elastomeric vulcanizates are improved by compounding an elastomer prior to vulcanization with a polydodecenamer reinforcing resin derived from cyclododecene and cyclododecadiene and vulcanizing the compounded elastomer.

14 Claims, No Drawings

POLYDODECENAMERS AS REINFORCING RESINS FOR ELASTOMERS

BACKGROUND OF THE INVENTION

This invention relates to a method of using polydodecenamers as reinforcing resins for elastomers. In a compositional aspect, this invention relates to elastomers compounded with polydodecenamer reinforcing resins.

Reinforcing resins are customarily added to elastomers prior to vulcanization, primarily to increase the hardness of the vulcanizates. Styrene-butadiene copolymers having a high styrene content are recognized in the art as suitable resins for this purpose.

Recently, difficulties have been encountered, due to a worldwide shortage of aromatics, in obtaining styrene monomer required for all previously applicable purposes. Consequently, there is an urgent need for styrene-free substitute products, such as reinforcing resins based on styrene.

Moreover, the styrene-rich reinforcing resins have disadvantages which limit their field of use. On the one hand, the elastomers which are combined with such reinforcing resins have impaired properties after vulcanization with respect to dynamic stress, as manifested, for example, by reduced elasticity and higher internal heat buildup. On the other hand, reinforcing resins having a high styrene content are not entirely suitable for addition to the inexpensive polyolefin rubbers, e.g., ethylene-propylenediene rubber, since they generally cause impairment of a number of properties controlling the use of the products.

French Pat. No. 2,157,214 discloses adding polyolefins to the elastomers as reinforcing resins. Although the hardness of the vulcanizates can thereby be increased, such a step simultaneously results in a great reduction in strength and of the utilitarian properties connected therewith, because the polyolefins are not incorporated into the vulcanizate structure.

Thus, there is a continuing need for resins having none of the disadvantages of reinforcing resins of the prior art as well as for styrene-free reinforcing resins.

The results attained using polydodecenamer reinforcing resins are unexpected in view of known uses of polyalkenamers.

German Unexamined Laid-Open Application DOS 1,595,739 discloses that polyoctenamers having a trans-vinylene content below about 60% are rubbery and are suitable for the production of a plurality of rubber products. Those having trans-vinylene contents of about 25-50%, and preferably below 25%, are recommended for use in tires.

Polyoctenamers having a trans-vinylene content of 60-70% have a high impact resistance and are used in jackets for golf balls and sheathings for cables, but polyoctenamers having a trans-vinylene content above 75% are described as fibrous and crystalline and are suitable for use in molded products.

According to DOS 2,123,452, a favorable effect is achieved with regard to green tensile strength, building tack, stretchability, aging characteristics, and degradation behavior, by adding polypentamers having a trans-vinylene content of more than 30% of polyisoprene in amounts of 5-95% by weight of the total mixture. Similar assertions are made with respect to building tack in DOS 2,063,716 for mixtures of polypentenamer and ethylene-propylene-diene elastomer (EPDM).

Finally, it is known from DOS 2,131,354 corresponding to U.S. Pat. 3,816,358 that adding 2-20% by weight of polyoctenamer and/or polydodedenamer with trans-vinylene contents of above 60% and RSV values of 0.2 – 3.0 dl./g. to an elastomeric compound increases the green tensile strength and the thermoplasticity of the unvulcanized rubber mixture, without a marked effect on the properties of the finished vulcanizate.

None of the above teachings suggests the use of specific polydodecenamers as reinforcing resins for elastomers. It is also surprising, in view of the art cited above, that polydodecenamers used in accordance with this invention can replace the styrene-rich reinforcing resins and provide improved properties to the product in their practical utilities and a wider field of application.

SUMMARY OF THE INVENTION

In a process aspect, this invention relates to a method for improving the properties of elastomeric vulcanizates comprising compounding with an elastomer prior to vulcanization a polydodecenamer reinforcing resin having a reduced specific viscosity, measured in decahydronaphthalene at 135° C., of 0.5 – 6 dl./g., and a trans-vinylene content of more than 60%, obtained by polymerization of a mixture of a. 50–05% by weight of cyclododecene,
b. 5–40% by weight of cyclododecadiene, and
c. up to 10% by weight of 1,5,9-cyclododecatriene, in a solvent by a metathesis catalyst; and vulcanizing the compounded elastomer.

In a composition aspect, this invention relates to an improved reinforced rubber compound comprising an elastomer and a polydodecenamer reinforcing resins having a reduced specific viscosity, measured in decahydronaphthalene at 135° C., of 0.5 – 6 dl./g., and a trans-vinylene content of more than 60%, obtained by polymerization of a mixture of a. 50–95% by weight of cyclododecene,
b. 5–40% by weight of cyclododecadiene, and
c. up to 10% by weight of 1,5,9-cyclododecatriene in a solvent by a metathesis catalyst.

DETAILED DESCRIPTION

The mixture of cyclododecene, cyclododecadiene, and, optionally, 1,5,9-cyclododecatriene required to prepare the polydodecenamers used according to this invention can readily be obtained by the partial hydrogenation of cyclododecatriene, preferably cis,trans,-trans-1,5,9-cyclododecatriene, which can be produced, for example, from butadiene according to the method of DOS 1,618,246.

In contrast to the production of polydodecene which is the starting material for pure polydodecenamer, it is unnecessary in making starting material for the present process to convert a relatively high proportion of the cyclododecatriene employed (about 15-20%) into inert cyclododecane which results in loss of polymerizable material and thereby raises the costs of the polymer correspondingly and is difficult to remove from the polymer owing to its high boiling point, but can volatilize during processing operations at a higher temperature and cause odor, smoking, and the deposition of sublimates.

The polymerization of the mixtures of (a) 50–95% by weight of cyclododecene; (b) 5–40% by weight of cyclododecadiene; and optionally (c) up to 10% by weight of 1,5,9-cyclododecatriene, which can also contain up to 10% by weight of cyclododecane as the polymerization-inactive component, can be carried out using a so-called metathesis catalyst in a solvent according to known methods for the production of polyalkenamers from cycloolefins. Most preferably the monomer charge comprises from 70 to 90% by weight of cyclododecene from 8 to 25% by weight of cyclododecadiene, from 0.5 to 5% by weight of 1,5,9-cyclododecatriene and up to 8% by weight of cyclododecane.

Metathesis catalysts mean homogeneous and heterogeneous catalysts containing compounds of metals of Subgroups 5–7 of the periodic table, primarily those of niobium, tantalum, molybdenum, tungsten, and rhenium, and, optionally, compounds of the metals of Main Groups 1–3 of the periodic table, e.g., their alkyls or hydrides, optionally with further ligands, for example, halogen, alkoxyl, or carboxylate, or in place thereof, Lewis acids. The metathesis catalysts can, as is known, contain activators including alcohols, epoxides, tert.-butyl hypochlorite, peroxides, carboxylic acids, aromatic nitro compounds, vinyl halogenides, vinyl and allyl ethers and esters. Preferred metathesis catalysts are combinations of tungsten hexachloride, aluminum trialkyl or alkylaluminumhalides aktivated by ethanol and/or epoxides and/or vinyl resp. allyl ethers of halogenated phenols. References an metathesis catalysts and activators therefore include U.S. Pat. Nos. 3,074,811; 3,458,489; 3,449,310; 3,459,725; 3,666,742; 3,476,728; 3,492,245; 3,492,278; 3,778,385; 3,558,517; 3,558,515 and 3,804,803.

The polymerization is generally conducted in a solvent appropriate for metathesis reactions with the aforementioned catalysts. Representative of the aliphatic, alicyclic, aromatic, and halogenated hydrocarbons solvents which can be used are the following: isopentane; hexane; heptane; n- and isooctanes; isononane (hydrogenated propene trimer); n-decane; isododecane (hydrogenated propene tetramer); cyclopentane; cyclohexane; methylcyclopentane; methylcyclohexane; ethylcyclohexane; isopropylcyclohexane; cyclooctane; decahydronaphthalene; hydrogenated terpenes, e.g., pinane and camphane; cyclohexene and substituted cyclohexenes; benzene; toluene; o-, m-, and p-xylenes; ethylbenzene; o-, m-, p-diethylbenzenes; n-propylbenzene; isopropylbenzene; and other mono- and polyalkyl benzenes; tetrahydronaphthalene; methylene chloride; chloroform; carbon tetrachloride; 1,2-dichloroethylene; trichloroethylene; tetrachloroethylene; chlorobenzene; o-dichlorobenzene; mixed trichlorobenzene isomers; bromobenzene; fluorobenzene, and 1,2-dichloroethane.

The critical characteristics of the polydodecenamers to be used according to this invention, reduced specific viscosity (RSV) and trans-vinylene content, can be readily measured by conventional measures during the polymerization.

Thus, molecular weight, as measured by reduced specific viscosity, can be regulated by the addition of open-chain olefins, as disclosed in DOS's 1,945,358; 1,919,047; 1,929,140; 2,046,722, and 2,058,183; unsaturated halogenated hydrocarbons as disclosed in DOS 2,028,716; unsaturated ethers disclosed in DOS 2,027,905; unsaturated esters disclosed in DOS 2,028,935; unconjugated dior polyolefins disclosed in DOS 2,105,161; or water, as disclosed in DOS 1,957,026.

Adjustment of the desired proportion of cis- and trans-configuration of the vinylene double bond present in the main chain of a polyalkenamer is done, for example, using the methods disclosed in DOS's 1,595,739; 1,812,383, or 1,957,025 and in DAS 1,299,868.

The critical properties of the polydodecenamers, obtained from a specific mixtures of monomers, as reinforcing resins is that they have reduced specific viscosity (RSV), measured in decahydronaphthalene at 135° C., of 0.5 – 6 dl./g., preferably 1 – 3 dl./g. Trans-vinylene content of more than 60%, preferably more than 70%, is required.

It is known that amounts of styrene-containing reinforcing resins added to elastomers can be varied within wide limits. The amount is determined by the desired final properties of the vulcanizate, primarily the hardness, and by the type and quantity of the remaining components of the elastomer mixture, primarily on the elastomers, fillers, and extenders, as well as on the vulcanization recipe. Another important factor is the differing styrene content of the various types of reinforcing resins.

The amounts of polydodedecenamers employed according to this invention can be varied over a wide range, so that it is difficult to set forth strict limits for ratio of reinforcing resin to elastomer and other additives.

However, additions in the range of 25 – 250 parts by weight of polydodecenamer resin per 100 parts by weight of the elastomer (p.h.r.) result in the aforementioned advantageous effects. Especially favorable results are achieved by addition of from 30 to 100 p.h.r.

In any given case, the optimum amount of reinforcing resin can easily be determined by a few preliminary experiments. Elastomers to which the reinforcing resins can be added advantageously include, for example, natural rubber, styrene-butadiene rubber, polybutadiene with various distributions of the double bonds, polyisoprene, and ethylene-propylene rubber (EPM) or ethylene-propylene diene rubber (EPDM). In the latter elastomers, the diene preferably is dicyclopentadiene, 1,4-hexadiene, or 5-ethylidene-2-norbornene.

Of styrene-butadiene elastomers used in compounds of this invention, those are preferred which contain 15 – 40% of styrene monomer units. Typical of commercially available styrene-butadiene resins which can be used are copolymers with a styrene/butadiene ratio of 85/15 to 60/40, e.g. DURANIT® 15 S and DURANTI® B.

Polybutadienes usable in the compounded elastomers of this invention include cis- and trans-polybutadiene-1,4 and polybutadiene-1,2. Exemplary of commercially available polybutadienes are polymers with a cis-1,4-structure of 98%, e.g. BUNA® CB 10, or of ca. 40% cis-1,4-structure, e.g. Diene®.

Polyisoprenes include cis- and trans-polyisoprenes, of which the cis-polymer is preferred. Commercially available polyisoprene elastomers include polymers with 92% cis-1,4-structure, e.g. Cariflex® IR or with 96% cis-1,4-structure, e.g. Natsyn®.

Exemplary of ethylene-propylene rubbers which can be used in this invention is BUNA® AP 201.

Typical of usable ethylene-propylene-diene rubbers are BUNA® AP 321, BUNA® AP 451 and NORDE®.

Most preferably, the compounded elastomer is based on a styrene-butadiene rubber.

The reinforcing resins used in this invention have excellent mixing and processing characteristics in comparison to prior art resins based on butadiene-styrene.

Normally, mixing of elastomer and reinforcing resin can be effected without a separate step simultaneously with incorporation of the vulcanizing agents and customary additives in rubber technology, using a rolling mill or an internal mixer. Customary additives can include a vulcanizing agent, an accelerator, a filler, a plasticizer, an anti-oxidant, an anti-ozanant or mixtures thereof.

The vulcanizing agents which can be employed are sulfur in combination with conventional vulcanization accelerators, with the addition of zinc oxide and higher fatty acids, e.g., stearic acid. Peroxides or special sulfur donors, for example, N,N'-morpholine disulfide or thiurams, can also be used for crosslinking purposes.

Suitable additives include active fillers and plasticizers. Fillers include carbon blacks of all levels of activity and mineral products, e.g., chalk, silicates, and highly active silicic acids. Suitable plasticizers include conventional refinery products, that is, oils having predominantly aromatic, naphthenic, or paraffinic components.

Also, conventional antiaging agents, i.e., antioxidants, and antiozonants can be added during compounding.

The subsequent cross-linking reaction or vulcanization is done in presses, autoclaves, etc., by techniques known in the art. See, generally, Kirk-Othmer "Encyclopedia of Chemical Technology", Second Edition, Volume 17, "Rubber Compounding", p. 543–645 for vulcanization techniques.

The compounded mixtures with the cyclododecenamer reinforcing resins are comparable to compounded mixtures produced using customary styrene-butadiene copolymers, according to plasticity data obtained by DIN 53 523.

In addition, vulcanizates obtained from the compounded mixtures including the reinforcing resins of this invention, have a slightly reduced vulcanizing induction time and the same vulcanizing time as compared to otherwise customary mixtures. The vulcanizates, in comparison to the products of the prior art, have identical strength and elongation, increased moduli, and identical hardness values at various temperatures. The most outstanding advantages of the vulcanizates reinforced according to this invention as compared to the conventional ones are elasticity, abrasion resistance, and compression set properties. In particular, the marked improvement in the abrasion resistance permits utilizing higher loadings of filler. This property is especially attractive for the economical use of the product as shoe soles, etc. In this connection, the aforementioned advantages with respect to elasticity and compression set are additional factors in favor of such uses. The reinforcing resins of this invention provide a more economical product because the specific gravity of the solid vulcanizates produced therefrom is 2–3% lower than that of the vulcanizates reinforced with styrene-butadiene copolymers.

In the production of porous soles, use of the reinforcing resins of this invention is advantageous in that the final products show an improved property spectrum, particularly as to abrasion resistance and compression set, when compared to those produced with styrene-containing reinforcing resins. Thus, higher loadings of filler are feasible, as above.

An additional unexpected property of vulcanizates containing polydodecenamers is the transparency of silicic-acid-containing mixtures, which is an effect unattainable with the customary reinforcing resins based on styrene-butadiene copolymers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

By the partial hydrogenation of industrially-produced 1,5,9-cyclododecatriene (at least 97% cis, trans, trans-form), a monomer mixture I was obtained having the following composition, as determined by gas chromatography:

Cyclododecane; 7.2% by weight
trans- + cis-Cyclododecene; 80.1% by weight
Cyclododecadienes; 11.4% by weight
Cyclododecatrienes; 1.1% by weight
High-boiling components; 0.2% by weight 1,500 ml. of this monomer mixture I was polymerized in a 6-liter glass reactor equipped with an agitator, an internal thermometer, a dropping funnel for the monomer mixture and one for the hexane, respectively, and a protective gas supply conduit, by adding 2.4 g. of 1-octene as the regulator in 4 l. of hexane, using a catalyst consisting of 1 millimole each of tungsten hexachloride, ethanol, allyltribromophenyl ether, and 7 millimoles of ethylaluminum dichloride. The polymerization was carried out as follows: 200 ml. of the monomer I/regulator mixture in 1,000 ml. of hexane was charged at room temperature; then, the catalyst was prepared in situ by adding 1 millimole each of tungsten hexachloride, ethanol, allyltribromophenyl ether, and 7 millimoles of ethylaluminum dichloride in the aforementioned sequence; thereafter, within one hour, the monomer I/regulator mixture and hexane were added in incremental portions. By cooling, the temperature of the reaction mixture was maintained at below 30° C. After the last addition, the mixture was agitated for another 30 minutes. Subsequently, the catalyst was decomposed with a solution of 12 g. of potassium hydroxide and 2 g. of 2,2'-methylene-bis(4-methyl-6-tert.-butylphenol) in 200 ml. of methanol. The polymer was precipitated into 5 l. of methanol, washed three times at 50° C. with isopropanol, and dried under vacuum. Yield: 1,070 g. (88% of theory). The reduced specific viscosity (RSV) of the polymer was 2.35 dl./g. The double bonds had the following configuration according to the IR spectrum: trans-vinylene/vinyl/cis-vinylene = 74/3/23.

EXAMPLE 2

By partial hydrogenation of 1,5,9-cyclododecatriene, a monomer mixture II was obtained having the following composition:

Cyclododecane; 2.6% by weight
trans- + cis-Cyclododecane; 80.3% by weight
Cyclododecadienes; 16.0% by weight
Cyclododecatrienes; 0.8% by weight
High-boiling components; 0.2% by weight 1,500 ml. of the monomer mixture II was polymerized and worked up in accordance with the description in Example 1, except that the amount of regulator added was increased to 4.3 g. of 1-octane. Yield: 1,096 g. (86% of theory). RSV value: 1.28 dl./g. Configuration of the double bonds: trans-vinylene/vinyl/cis-vinylene = 77/2/21.

EXAMPLE 3

According to the directions given in Example 1, 1,500 ml. of monomer mixture II was polymerized and worked up. As compared to Examples 1 and 2, the amount of regulator added was 8.5 g. of 1-octene. Yield: 1,045 g. (82% of theory). RSV value: 0.90 dl./g. Configuration of the double bonds: trans-vinylene/vinyl/cis-vinylene = 85/1/15.

EXAMPLE 4

Vulcanizates were made up employing in Mixture (B) a conventional styrene resin reinforced styrene-butadiene copolymer and in Mixture (A) the reinforcing styrene resin was replaced by the same amount of the polydodecenamer (trans-vinylene content = 74%) described in Example 1, having an RSV value of 2.35 dl./g. The mixture was produced on a laboratory rolling mill of a size of 250 × 400 mm., at a friction of 1:1.2 and a roll temperature of 50° C.

| Recipes: | A | B | (Parts) |
|---|---|---|---|
| Styrene-butadiene rubber (SBR 1502) | 70.0 | 70.0 | |
| Styrene resin batch 60% styrene | 30.0 | — | |
| Polydodecenamer according to Example 1 | — | 30.0 | |
| Zinc oxide | 1.0 | 1.0 | |
| Diethylene glycol | 2.0 | 2.0 | |
| Stearic acid | 1.0 | 1.0 | |
| Highly disperse, precipitated silicic acid | 50.0 | 50.0 | |
| Zinc salt of 2-mercapto-benzothiazole | 1.0 | 1.0 | |
| Diphenylguanidine | 1.8 | 1.8 | |
| Hexamethylenetetramine | 0.6 | 0.6 | |
| Sulfur | 1.75 | 1.75 | |

|  | A | B |
|---|---|---|
| Mixture $ML_{1+4}$ (100° C.) | 87 | 84 |

The following is a comparison of the vulcanizate properties:

|  | 50 Minutes at 150° C. | |
|---|---|---|
| Press Vulcanization: | A | B |
| Tensile strength (M Pa) | 21.7 | 22.9 |
| Elongation at rupture (%) | 558 | 528 |
| Modulus 300% (M Pa) | 9.0 | 12.4 |
| Tear propagation resistance according to Pohle (N/mm) | 40 | 48 |
| Permanent elogation (%) | 70 | 70 |
| Hardness (Shore A) 22° C. | 85 | 86 |
| 45° C. | 85 | 85 |
| 75° C. | 76 | 75 |
| 120° C. | 73 | 73 |
| Elasticity (%) 22° C. | 31 | 40 |
| 75° C. | 30 | 47 |
| DIN Abrasion (mm³) | 205 | 144 |
| Compression set B 22 h at 70° C. (%) | 55 | 35 |
| Specific gravity | 1.18 | 1.15 |

As for specific gravity, moduli, elasticity, abrasion, and compression set, the superiority of the vulcanizate reinforced with a polydodecenamer of the invention as compared to the vulcanizate reinforced with a styrene-butadiene copolymer has clearly been demonstrated.

EXAMPLES 5 AND 6

In a mixture B set forth in Example 4, one uses, in the same quantities, in place of the polydodecenamer having an RSV value of 2.35 dl./g., the polydodecenamers described in Examples 2 and 3 having a trans-vinylene content of 77% and an RSV value of 1.28 dl./g. (mixture C) and/or with a trans-vinylene content of 85% and an RSV value of 0.90 dl./g. (mixture D).

| Result: (For comparison, see mixture B in Example 4.) | | |
|---|---|---|
|  | 50 Minutes at 150° C. | |
| Press Vulcanization: | C | D |
| Tensile strength (M Pa) | 18.6 | 18.6 |
| Elongation at rupture (%) | 566 | 622 |
| Modulus 300% (M Pa) | 8.7 | 7.0 |
| Tear propagation resistance according to Pohle (N/mm) | 43 | 48 |
| Permanent elongation (%) | 88 | 100 |
| Hardness (Shore A) 22° C. | 82 | 82 |
| 45° C. | 82 | 82 |
| 75° C. | 72 | 68 |
| 120° C. | 72 | 67 |
| Elasticity (%) 22° C. | 40 | 37 |
| 75° C. | 39 | 34 |
| DIN Abrasion (mm³) | 124 | 152 |
| Compression set B 22 h at 70° C. (%) | 24 | 32 |

While in case of mixture C the advantages attainable by this invention are apparent from the property spectrum, the values, especially with regard to the thermal hardness, are no longer within the advantageous range when using a polydodecenamer having an RSV value of 0.90 dl./g. (mixture D). It can be seen therefrom that polydodecenamers having RSV values of above 1.0 dl./g. are especially suitable for use in accordance with this invention.

EXAMPLE 7

In a mixture which can serve, for example, for the production of porous sole plates, the proportion of reinforcing resin batch based on styrene-butadiene (mixture E) is replaced by the polydodecenamer described in Example 1 having a trans-vinylene content of 74% and an RSV value of 2.35 dl./g. (mixture F) in the same amount. The recipes are as follows:

|  | E (Parts) | F (Parts) |
|---|---|---|
| SBR 1551 | 70.0 | 70.0 |
| Styrene resin batch 60% styrene | 30.0 | — |
| Polydodecenamer acc. to Example 1 | — | 30.0 |
| Zinc oxide | 5.0 | 5.0 |
| Stearic acid | 1.5 | 1.5 |
| Highly disperse, precipitated silicic acid | 40.0 | 40.0 |
| Kaolin | 20.0 | 20.0 |
| Iron oxide pigment | 5.0 | 5.0 |
| Coumarone resin (m.P. 75° C.) | 10.0 | 10.0 |
| Paraffin wax | 2.0 | 2.0 |
| 4,4'-Dihydroxydiphenyl | 1.0 | 1.0 |
| Dibenzothiazyl disulfide | 1.5 | 1.5 |
| Sulfur | 2.5 | 2.5 |
| Azodicarbonamide | 3.5 | 3.5 |

The properties of the vulcanizates are compared as follows:

|  | 20 Minutes at 151° C. | |
|---|---|---|
| Press Vulcanization: | E | F |
| Specific gravity | 0.72 | 0.76 |
| Hardness (Shore A) | 55 | 59 |
| Elasticity (%) | 28 | 36 |
| DIN Abrasion (mm³) | 269 | 98 |
| Compression set B 22 h at 70° C. (%) | 94 | 77 |

| Shrinkage (Absolute Dimensions in cm., Initial Size 10.0 × 10.0 cm.) | | |
|---|---|---|
| | E | F |
| Immediate measurement (cm) | 13.2 × 13.6 | 12.5 × 12.4 |
| Size after tempering 15' at 130° C (cm) | 13.2 × 13.2 | 12.6 × 12.7 |
| Size after tempering 1 h at 100° C (cm) | 12.8 × 12.8 | 12.3 × 12.3 |
| Size after tempering 24 h at 22 ° C (cm) | 12.6 × 12.5 | 11.9 × 12.0 |

It can clearly be seen from the above that, with the reinforcing resin of this invention, with an otherwise identical level of characteristic values with regard to abrasion resistance and compression set, better results are achieved than with the use of a reinforcing resin on the basis of styrene-butadiene copolymer.

EXAMPLE 8

Vulcanisates were made up employing EPDM rubber (ethylidene norbornene as termonomer). Mixture (G) contained only EPDM (100 parts). Mixture (H) contained EPDM (70 parts) and as a reinforcing resin conventional styrene-butadiene copolymer (30 parts) and Mixture (I) contained EPDM (70 parts) and polydodecenamer described in Example 1 (30 parts). The mixture was produced according to Example 4.

| Recipes: | G | H | I |
|---|---|---|---|
| EPDM-rubber | 100.0 | 70.0 | 70.0 |
| Styrene butadiene resin (60 % styrene) | — | 30.0 | — |
| Polydodecenamer according to Example 1 | — | — | 30.0 |
| Zinc oxide | 4.0 | 4.0 | 4.0 |
| Stearic acid | 0.5 | 0.5 | 0.5 |
| Carbon black N 550 (FEF) | 50.0 | 50.0 | 50.0 |
| Paraffinic oil | 5.0 | 5.0 | 5.0 |
| Benzothiazyl-2-tert.-butyl-sulfenamide | 1.0 | 1.0 | 1.0 |
| Tetramethylthiuramdisulfide | 0.5 | 0.5 | 0.5 |
| Diphenylguanidine | 0.3 | 0.3 | 0.3 |
| Sulfur | 1.2 | 1.2 | 1.2 |
| Mixture ML 1+4 (100° C.) | 65 | 70 | 64 |

The following is a comparison of the vulcanizate properties:

| Press Vulcanization | 30 Minutes at 160° C. | | |
|---|---|---|---|
| Tensile strength (M Pa) | 14,1 | 8,8 | 13,1 |
| Elongation at rupture (%) | 376 | 300 | 330 |
| Modulus 300 % (M Pa) | 10,8 | 8,8 | 12,0 |
| Permanent elongation (%) | 10 | 64 | 27 |
| Hardness (Shore A) 22° C. | 68 | 86 | 76 |
| 75° C. | 66 | 72 | 69 |
| Elasticity (%) 22° C. | 54 | 33 | 53 |
| 75° C. | 60 | 28 | 56 |
| Compression set B 22 h at 70° C. (%) | 8 | 74 | 21 |
| Specific gravity | 1,07 | 1,11 | 1,08 |

As for compound viscosity, tensile strength, moduli, elasticity, permanent elongation, compression set and specific gravity, the superiority of the vulcanizate reinforced with a polydodecenamer of the invention as compared to the vulcanizate reinforced with a styrene-butadiene copolymer has clearly been demonstrated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for improving the properties of elastomeric vulcanizates comprising compounding with 100 parts by weight of an elastomer prior to vulcanization 25-250 parts by weight of a polydodecenamer reinforcing resin having a reduced specific viscosity, measured in decahydronaphthalene at 135° C., of 0.5 - 6 dl./g., and a trans-vinylene content of more than 60%, obtained by polymerization of a mixture of
   a. 50-95% by weight of cyclododecene,
   b. 5-40% by weight of cyclododecadiene, and
   c. up to 10% by weight of 1,5,9-cyclododecatriene, in a solvent by a methathesis catalyst; and vulcanizing the compounded elastomer.

2. The method of claim 1, wherein the polydodecenamer reinforcing resin has a reduced specific viscosity, in decahydronaphthalene at 135° C., of 1 - 3 dl./g.

3. The method of claim 1, wherein the polydodecenamer resin has a trans-vinylene content of more than 70%.

4. The method of claim 1, wherein 30-100 parts by weight of polydodecenamer are compounded with 100 parts by weight of the elastomer.

5. The method of claim 1, wherein said elastomer is a styrene-butadiene rubber.

6. The method of claim 1, wherein a vulcanizing agent, an accelerator, a filler, a plasticizer, an anti-oxidant, an anti-ozonant or a mixture thereof, is compounded with said elastomer and the polydodecenamer reinforcing resin.

7. The method of claim 2, wherein 30-100 parts by weight of polydodecenamer resin having a trans-vinylene content of more than 70% are compounded with 100 parts by weight of a styrene-butadiene rubber.

8. A uniformly admixed rubber composition comprising 100 parts by weight of an elastomer and 25-250 parts by weight of a polydodecenamer reinforcing resin having a reduced specific viscosity, measured in decahydronaphthalene at 135° C., of 0.5 - 6 dl./g., and a trans-vinylene content of more than 60%, obtained by polymerization of a mixture of
   a. 50-95% by weight of cyclododecene,
   b. 5-40% by weight of cyclododecadiene, and
   c. up to 10% by weight of 1,5,9-cyclododecatriene in a solvent by a metathesis catalyst.

9. The composition of claim 8, wherein the polydodecanamer reinforcing resin has a reduced specific viscosity of 1 - 3 dl./g.

10. The composition of claim 8, wherein the polydodecenamer resin has a trans-vinylene content of more than 70%.

11. The composition of claim 8, comprising 30 - 100 parts by weight of the polydodecenamer resin and 100 parts by weight of the elastomer.

12. The composition of claim 8, wherein the elastomer is a styrene-butadiene rubber.

13. The composition of claim 8, comprising the elastomer, the polydodecenamer and a vulcanizing agent, an accelerator, a filler, a plasticizer, an anti-oxidant, an anti-ozonant or a mixture thereof.

14. A composition according to claim 9, wherein 30–100 parts by weight of a polydodecenamer resin having a trans-vinylene content of more than 70% are compounded with 100 parts by weight of a styrene-butadiene rubber.

* * * * *